United States Patent
Friend et al.

(10) Patent No.: US 7,243,081 B2
(45) Date of Patent: Jul. 10, 2007

(54) METHOD OF DETERMINING OPTIMAL ASSET ALLOCATION UTILIZING ASSET CASH FLOW SIMULATION

(75) Inventors: Edward H. Friend, Washington, DC (US); Robert T. McCrory, Seattle, WA (US)

(73) Assignee: EFI Actuaries, Washington, DC (US)

( * ) Notice: Subject to any disclaimer, the term of this patent is extended or adjusted under 35 U.S.C. 154(b) by 1060 days.

(21) Appl. No.: 09/775,791

(22) Filed: Feb. 5, 2001

(65) Prior Publication Data

US 2002/0038271 A1 Mar. 28, 2002

Related U.S. Application Data

(63) Continuation-in-part of application No. 09/500,229, filed on Feb. 8, 2000, now Pat. No. 6,219,650, which is a continuation of application No. 09/016,632, filed on Jan. 30, 1998, now Pat. No. 6,055,517, and a continuation-in-part of application No. 08/550,503, filed on Oct. 30, 1995, now Pat. No. 5,774,881.

(60) Provisional application No. 60/037,109, filed on Jan. 31, 1997.

(51) Int. Cl.
G06Q 40/00 (2006.01)
(52) U.S. Cl. ............... 705/36; 705/35; 705/1
(58) Field of Classification Search ........... 705/35, 705/36, 1
See application file for complete search history.

(56) References Cited

U.S. PATENT DOCUMENTS 5,774,881 A 6/1998 Friend et al.
5,812,987 A * 9/1998 Luskin et al. ............. 705/36
5,812,988 A 9/1998 Sandretto
5,819,238 A 10/1998 Fernholz
5,884,287 A 3/1999 Edesess
6,012,043 A * 1/2000 Albright et al. ......... 705/36 R
6,018,722 A 1/2000 Ray et al.
6,055,517 A 4/2000 Friend et al.
6,219,650 B1 * 4/2001 Friend et al. ............. 705/36 R

FOREIGN PATENT DOCUMENTS

WO WO96/06402 2/1996
WO WO 96/06402 * 2/1996

OTHER PUBLICATIONS

Bensman, Miriam. How pension officers tame risk. Institutional Investor. New York: May 1995. vol. 29, Iss. 5; p. 45 (8 pages).*

(Continued)

Primary Examiner—Richard E. Chilcot, Jr.
Assistant Examiner—Jennifer Liversedge
(74) Attorney, Agent, or Firm—Greenberg Traurig, LLP; Richard E. Kurtz; James E. Goepel (57) ABSTRACT

A method of simulating future cash flow for a given asset allocation under a variety of economic conditions, measuring the frequency of failure of the cash flow to avoid one or more predefined risks. Assigning user-selected weights to avoidance of specified risks and alternative user-selected weights to maximization of rate of return, the invention utilizes the cash flow simulation to produce a performance index. By methodological testing through asset allocation adjustments, the optimum performance index is determined, thereby identifying the optimum asset allocation.

62 Claims, 10 Drawing Sheets

OTHER PUBLICATIONS

IBM (Dick Shareshian), 1985. "Funds Allocation System," The Funds Management Group Inc.

Abken, Peter A. Mar. 1992. "Corporate Pensions and Government Insurance: Déjà Vu All Over Again?," Economic Review, vol. 77, No. 2, pp. 1-16.

Ranftle et al., Nov. 1993. "Helping Employees Invest Wisely," HR Magazine.

Bensman, Miriam. May 1995. "How Pension Officers Tame Risk," Institutional Investor, vol. 29, No. 5, pp. 45-55.

Quicken Financial Planner: User's Guide (Version 2 for Windows). Mar. 1996. Quicken Investment Services, Inc., pp. 65-104.

* cited by examiner

METHOD OF DETERMINING OPTIMAL ASSET ALLOCATION UTILIZING ASSET CASH FLOW SIMULATION

RELATED APPLICATIONS

This application is a continuation-in-part of U.S. patent application Ser. No. 09/500,229, filed Feb. 8, 2000, now U.S. Pat. No. 6,219,650 which is a continuation of U.S. patent application Ser. No. 09/016,632, filed Jan. 30, 1998, now U.S. Pat. No. 6,055,517, which claims priority from U.S. Provisional Patent Application No. 60/037,109, filed Jan. 31, 1997, and is a continuation-in-part of U.S. patent application ser. No. 08/550,503, filed Oct. 30, 1995, now U.S. Pat. No. 5,774,881, all of which are incorporated herein by reference.

BACKGROUND OF THE INVENTION

1. Field of the Invention

In consideration of an investment portfolio, such as a pension fund, with oversight by law board members, the invention concerns non-sophisticated methods of determining an optimum allocation of assets to generate a maximum rate of return consonant with recognition of specified risk avoidance criteria. More specifically, the invention provides a method of simulating future trust fund cash flow for a given asset allocation and measuring the frequency of failure of the cash flow to avoid one or more predefined risks. Applying user-selected weights to frequencies of failure to avoid specified risks supplemented by the application of user-selected weight to rate of return, the invention produces a performance index. Through methodical asset allocation adjustments, the optimum performance index is determined, thereby identifying the optimum asset allocation for the given criteria.

2. Background of the Related Art

Trustees of pension funds seek the highest possible investment return within acceptable risk parameters. Heavy investments in common stock produce high returns, for example, but these returns are volatile, and this volatility may lead to an unacceptable frequency of failure to avoid certain kinds of risk. Investments in cash equivalents are far less volatile, but yields are unacceptably low and, accordingly, plans with such assets may experience unacceptable frequency of failure to avoid other kinds of risk. An optimum asset allocation made up of stocks, bonds, cash equivalents and other asset classes is therefore desirable to minimize frequency of failure to avoid predefined risks while maintaining acceptable returns. It is difficult, however, to determine what mix of asset classes and in what proportion the best performance likelihood is produced, taking into consideration user-identified risk avoidance criteria.

Various methods are currently used by pension fund managers in an attempt to maximize return while minimizing risk. For example, one such method of solving the problem of maximizing return while minimizing risk involves developing the asset allocation likely to produce the highest return at a given level of portfolio volatility. This method, however, is not a plan-specific solution and therefore may not produce the best results for a given plan. Another approach is to develop the asset allocation which, within a stipulated time horizon at the calculated plan contribution level, will lead to an acceptable probability of achieving a selected funded ratio of assets to liabilities. While this approach is plan-specific, as different solutions apply to different plans with different levels of assets, such an approach involves consideration of probability of meeting one goal at a fixed point in time, rather than frequency of failure to avoid multiple risks at multiple time frames. Moreover, such an approach requires a sophisticated understanding of the manner in which liabilities are developed. For example, funding ratios can change with changes in actuarial assumptions, creating a degree of artificiality in the measurement. Finally, a focus on a stipulated time horizon involves a restricted view which can be modified only upon considerable revision.

In view of the above, it is an object of the invention to provide a method of determining an optimum allocation of assets to generate a maximum rate of return for an investment portfolio within acceptable risk level(s), overcoming the deficiencies of the conventional methods discussed above.

SUMMARY OF THE INVENTION

The invention provides a non-sophisticated method of simulating future cash flow for a given asset allocation under a variety of economic conditions, measuring the frequency of failure of the cash flow to avoid one or more predefined risks. Assigning user-selected weights to avoidance of specified risks and alternative user-selected weights to maximization of rate of return, the invention utilizes the cash flow simulation to produce a performance index. By methodological testing through asset allocation adjustments, the optimum performance index is determined, thereby identifying the optimum asset allocation.

The simulation of cash flow generates a plurality of asset cash flow projections for a given asset allocation that are evaluated by (i) counting plan-specific failures to avoid predefined risks and (ii) determining average investment return, and applying user-selected weightings to the predefined risk failure rates and average return for each asset allocation. The predefined risks are generally established at a threshold multiple of a risk factor as of a given time or within a given time frame, such as no less than a specific percentage of payroll costs at for example, five years from the commencement of the instant analysis or assets less than a multiple of benefits outflow at any time prior to for example, ten years from the commencement date of the instant analysis.

The occurrence of an asset cash flow projection falling below the risk tolerance baseline at a point in time or within a baseline time period defines a risk tolerance failure event. For the asset cash flow projections associated with a given asset allocation, the number of risk tolerance failure events is multiplied by the associated weight for each predefined risk. A weighted average return (or weighted average gain cost) is introduced. The asset allocation is then adjusted within allowable asset class limits and the process is repeated until the highest-weighted result, identified as the highest performance index, is achieved. This then is the optimum asset allocation.

This invention determines a plan specific optimal asset allocation, where plan specific means the computer process produces a result for any particular plan described by its projected benefit cashflow and projected covered payroll or alternatively by its specific characteristics such as one or more:

its particular plan membership (each active member having an identifying salary history, date of birth, sex and date of hire or other date of plan participation commencement . . . and each pensioner and designated survivor having identifying date of birth, sex and formulated current or deferred annual benefit stream).
its particular plan design representing the rules for benefit eligibility and how a benefit is calculated.
its particular funding status (plan assets on hand) and its particular sources of future new funds determined by its specific financing formula.
and/or any other feature of the particular plan.

Optimal asset allocation means dividing or distributing the current and/or future plan assets among one or more available asset classes (e.g., domestic common stock, foreign bonds, real estate, cash equivalents, etc.) in that particular tolerable arrangement, demonstrated by a simulation of, for example, future financial projections of user-selected risk tolerance factors in association with user-selected risk tolerance baselines, likely to produce the best or preferred risk tolerance failure performance as measured by a performance index.

Tolerable asset allocation is one whose proportionate arrangement falls within, for example, the user's predetermined range of acceptable asset allocation assignments to the one or more available asset classes (e.g., no less than 40 percent nor more than 75 percent of the portfolio shall consist of domestic equities, no less than 10 percent nor more than 50 percent of the portfolio shall consist of domestic bonds, etc.).

Simulation of a future financial projection shall be, for example, a large or substantial number of such financial projections each generated by (or as the result of) a series of, for example, Monte Carlo controlled random inflation and "real" return (return net of inflation) selections from the past, user modified past, or parametrically anticipated future behavior of plan assets invested in accordance with the selected asset allocation (e.g., a large number of cash flow projections of future plan asset levels or a large number of future fundable plan cost projections determined as the result of controlled random selections of inflation and real investment return from a past defined period).

Risk tolerance factor is a characteristic of the plan's future financial behavior, for example, as of a given point in time, as of a series of points in time, or as an average within a specified period, including but not limited to, for example, one or more of:
  its asset levels
  its fundable cost level Risk tolerance baseline is a second or another characteristic of the plan's future financial behavior against which the risk tolerance factor is compared as of a given point in time, as of a series of points or interval in time or as an average within a specified period, including, for example, but not limited to:
  its annual benefit outflow level
  its asset level
  its fundable cost level
  the payroll of participating active plan members either in the current year or in a prior or future year.

Risk tolerance failure is the relative frequency of adverse comparisons. A comparison is a feature of the relationship of the risk tolerance factor to the risk tolerance baseline (e.g., one becomes larger than the other).

As an example, identification of that particular asset allocation predicted by simulation likely to cause the lowest frequency of assets falling below 10 times annual benefits over the next 10 years or lowest frequency of assets falling by 20% (or more) or any other selected percentage in one year.

A performance index is the user-selected weighted average of or user defined risk tolerance failures among user-selected risk tolerance factors compared to the one or more risk tolerance baselines (e.g., 30% weight on risk tolerance failure rate measured by frequency of assets falling below 10 times annual benefits at a point 5 years hence and 70% weight on risk tolerance failure rate measured by frequency of cost rising by 15 percent or more as a percentage of payroll at any time over the next 10 years).

Graphs A, B, and C reflect 100-trial simulations of the cash flow of a particular pension trust fund over the 20-year period 1994 through 2014 under each of three different asset allocation selections.

Graph B reflects cash flows if the assets of the trust fund are invested 100% in stock. Graph C reflects cash flows if the assets are invested 100% in cash equivalent securities. Graph A, on the other hand, reflects cash flow if the assets are involved in stocks (63%), and cash (9%).

In 1994 the trust fund has assets of 350% of the active member payroll. Over the years, these assets are increased by investment return, employer and employee contributions and reduced by pensioner benefit disbursements and expenses.

The trustees want to maximize return in the asset allocation selection but also want to protect benefit security. If converted into the purchase of annuities, a lump sum of somewhat less than, but in the neighborhood of, 10 times benefits would be required to protect the security of all pensioners of record at any point in time. Trustees regard this as a floor of protection. The risk of failure to provide this protection throughout the next 20 years is of concern.

A line at the bottom of each graph reflects 10 times evolving benefit disbursements. Benefit disbursements increase more rapidly than payroll, starting at 19.5% of payroll in 1994 and reaching 36.5 of payroll in the year 2014. The 10 times numbers are 105% in 1994 and reach 365% in the year 2014.

Note the cross-overs in Graph A. In 1999, two of the simulations violate the ten times line. In 2004, five simulations violate the line at that time and so on. Also note that the all-cash program has only one failure before the twentieth year but then, in the twentieth year, there are 82 failures because the investment return is insufficient to protect the program and the assets begin to fall relative to payroll.

If the trustees place 60% weight on optimum return and 10% negative weight on failures at the intervals five years, ten years, fifteen years, and twenty years out, we have the following determinations.

TABLE 1

| Asset Allocations | Expected Investment Return | Funding Percentage | | | | Performance Index [1] |
|---|---|---|---|---|---|---|
| | | 5 Years Out | 10 Years Out | 15 Years Out | 20 Years Out | |
| A | 8.5% | 2 | 5 | 6 | 13 | 2.5 [2] |
| B | 10 | 4 | 9 | 13 | 19 | 1.5 [3] |
| C | 5 | 0 | 0 | 1 | 82 | −5.3 [4] |

[1] 60% Expected Investment Return − 10% of each Failure Percentage.
[2] .6 × 8.5 − .1(2 + 5 + 6 + 13).
[3] .6 × 10 − .1(4 + 9 + 13 + 19).
[4] .6 × 5 − .1(0 + 0 + 1 + 82).

The trustees, if given asset allocations A, B, and C would, based on the above criteria, select asset allocation A because of the superior performance index.

Clearly Table 1 above is illustrative only. There are many performance indices that could be constructed involving many more than one failure criterion. Nevertheless, the above is illustrative of how the process works.

Figure 1:
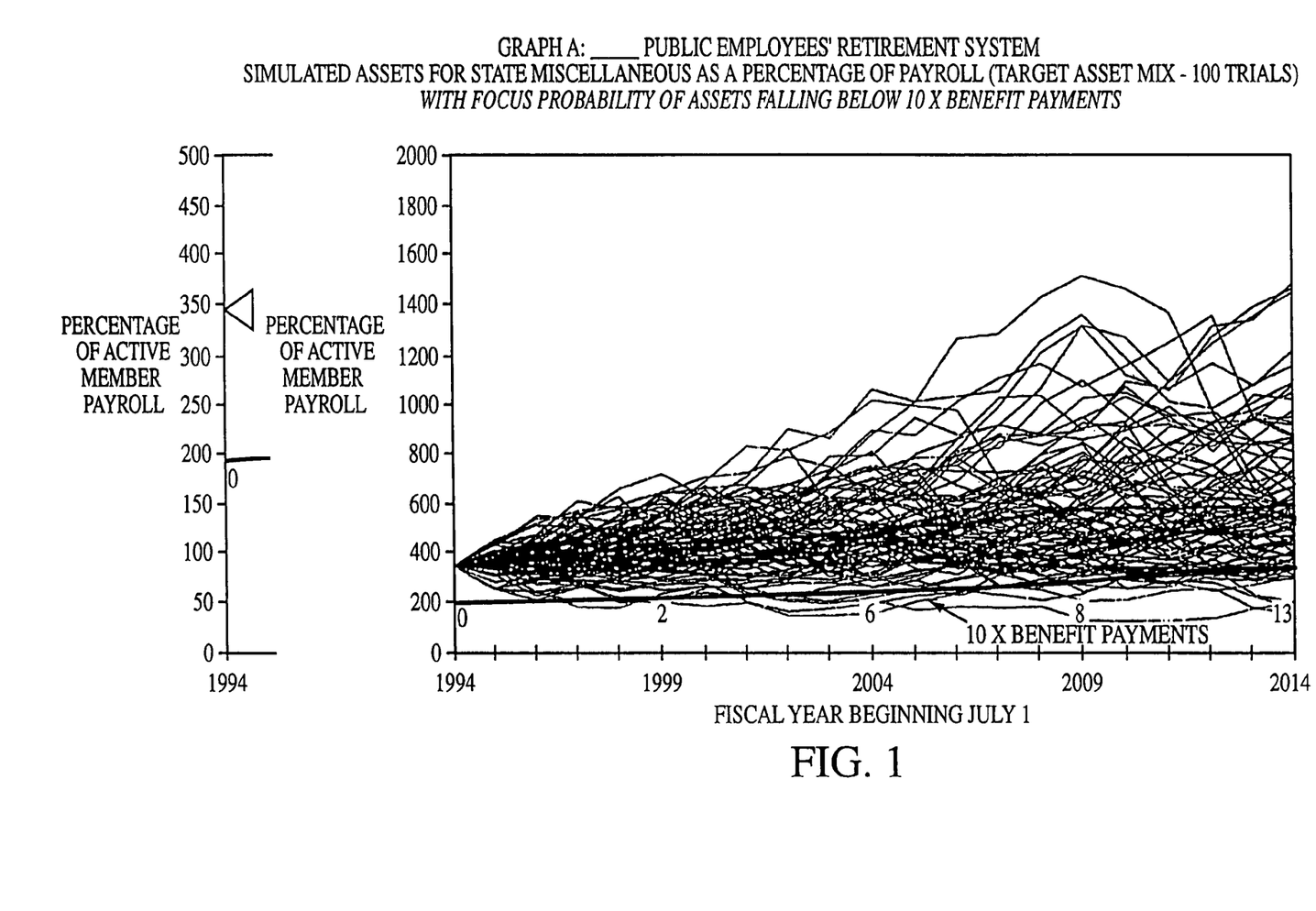
FIG. 1 is a graph of 100-trial simulations of cash flow of a pension trust fund with a focus on the probability of assets falling below ten times benefit payments.
Figure 2:
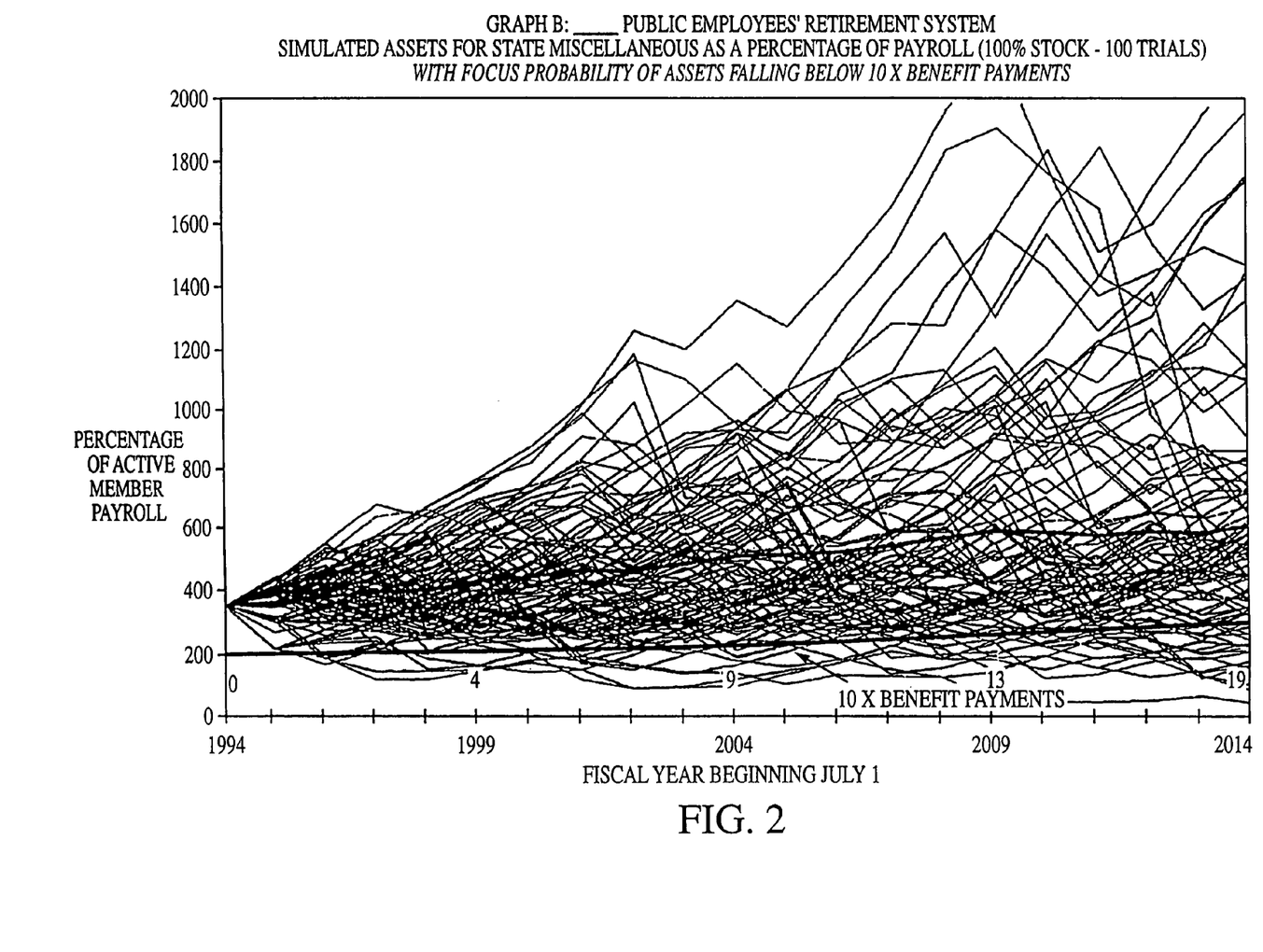
FIG. 2 is a graph of 100-trial simulations of cash flow of a pension trust fund with a focus on the probability of assets falling below ten times benefit payments.
Figure 3:
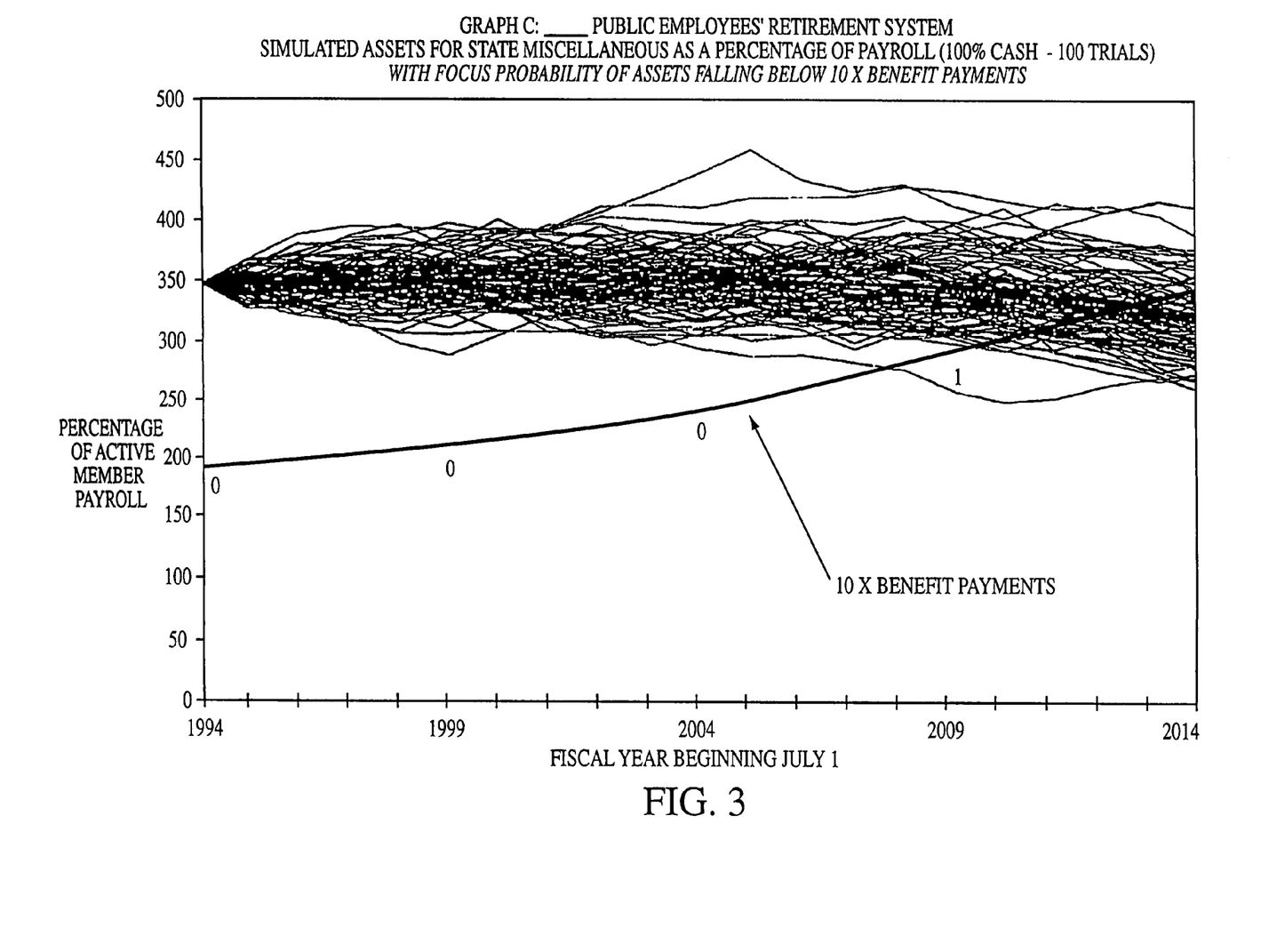
FIG. 3 is a graph of 100-trial simulations of cash flow of a pension trust fund with a focus on the probability of assets falling below ten times benefit payments.
Figure 4:
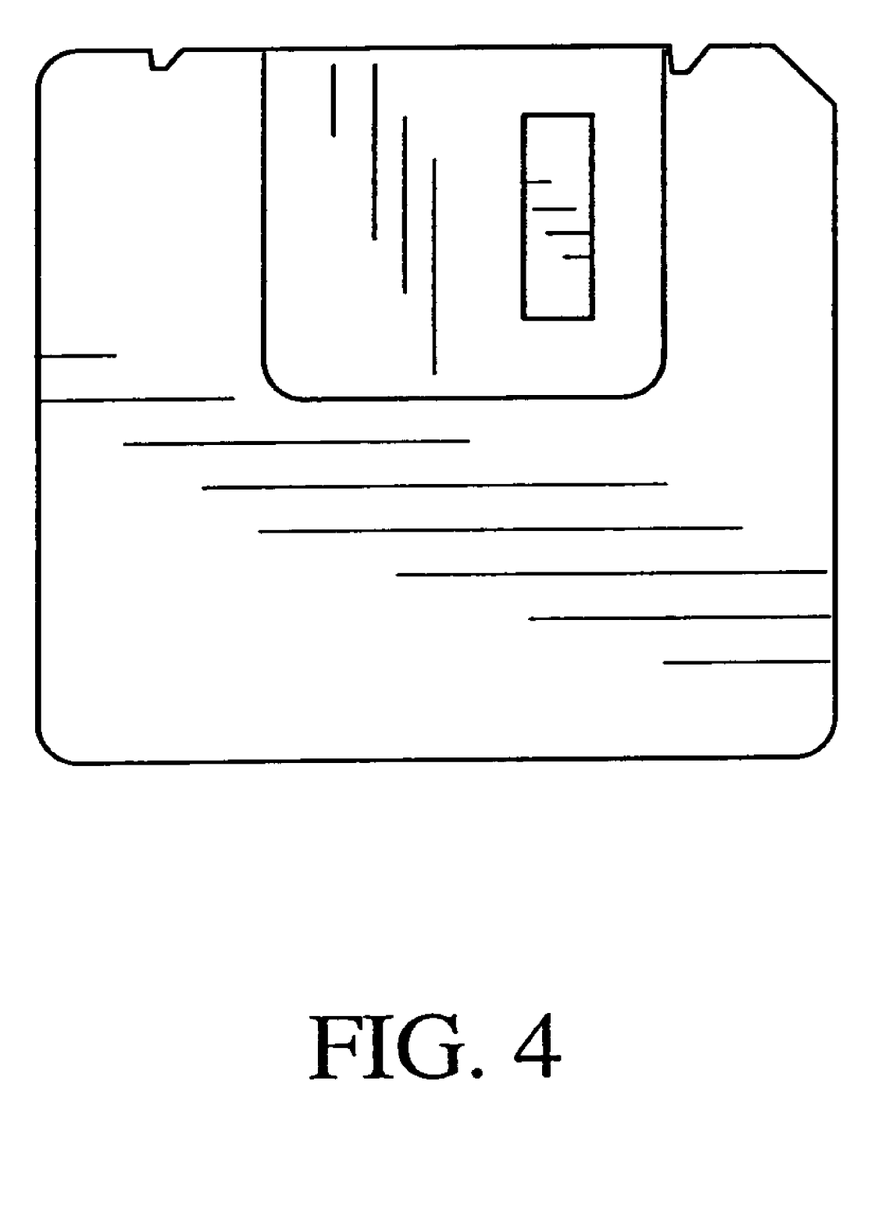
FIG. 4 is an example of a recording medium readable by a computer.
Figure 5:
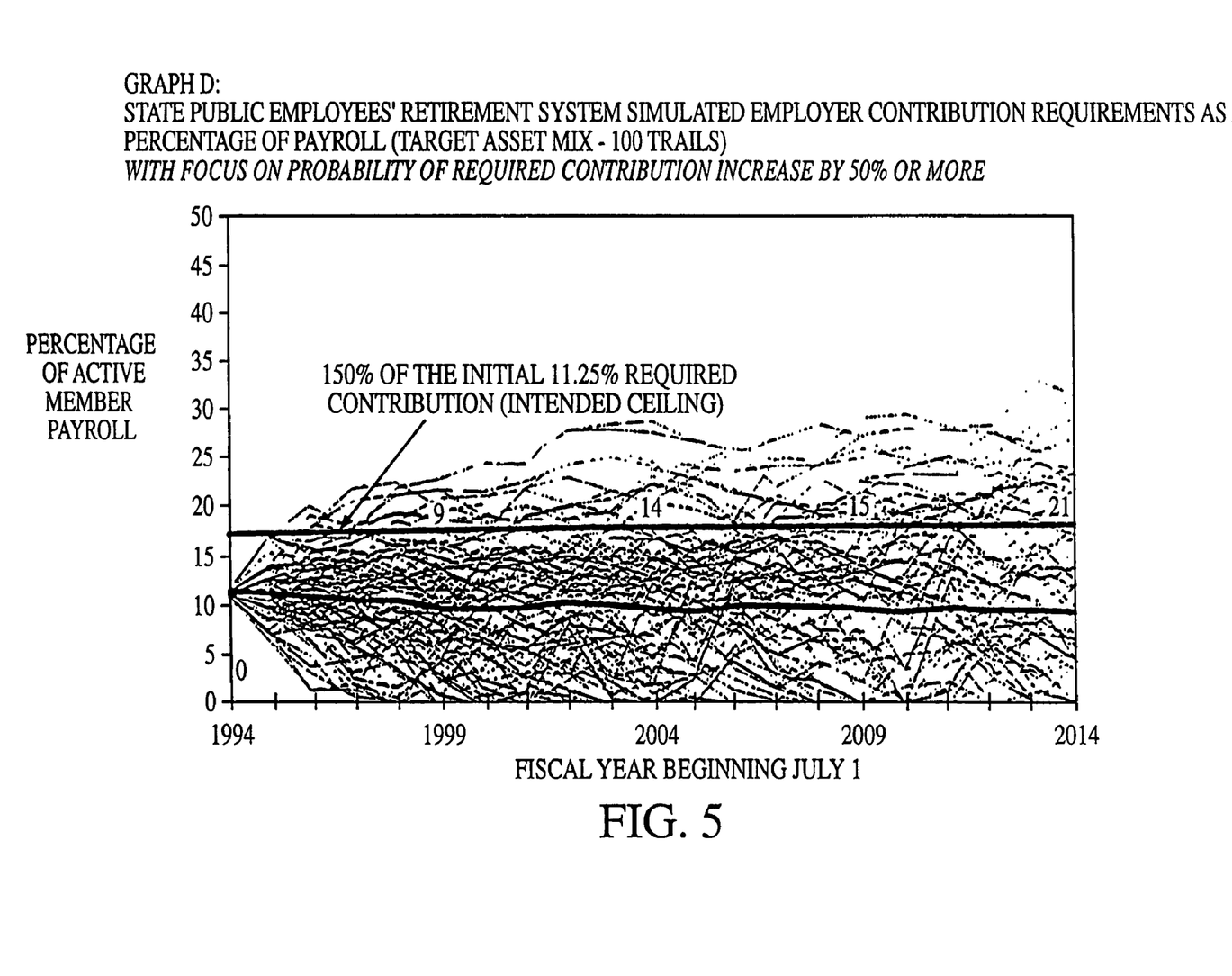
FIG. 5 is a graph of 100-trial simulations of contribution requirements of a pension trust fund as a percentage of payroll with a focus on the probability of a required contribution increase of 50% or more.
Figure 6:
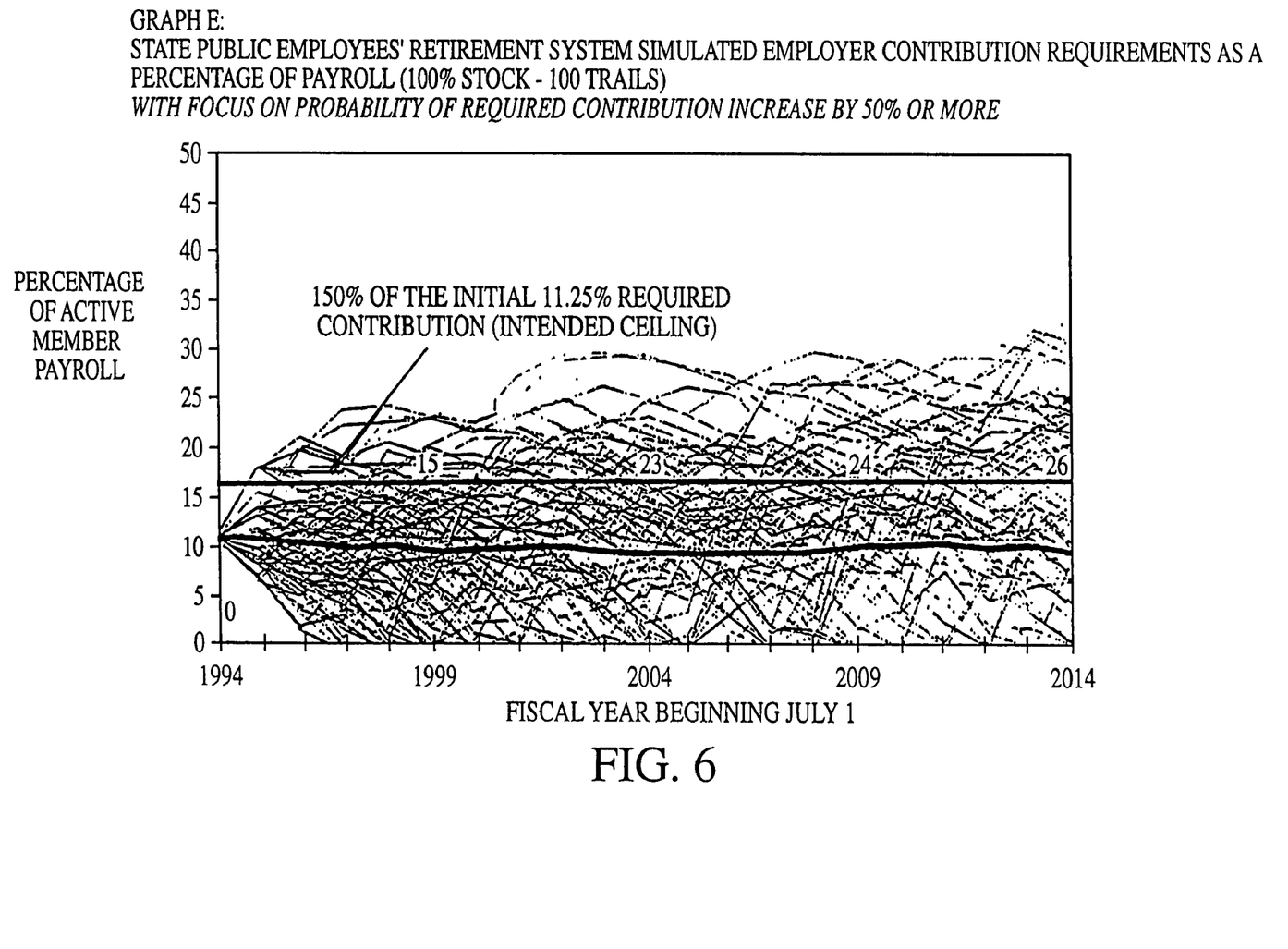
FIG. 6 is a graph of 100-trial simulations of contribution requirements of a pension trust fund as a percentage of payroll with a focus on the probability of a required contribution increase of 50% or more.
Figure 7:
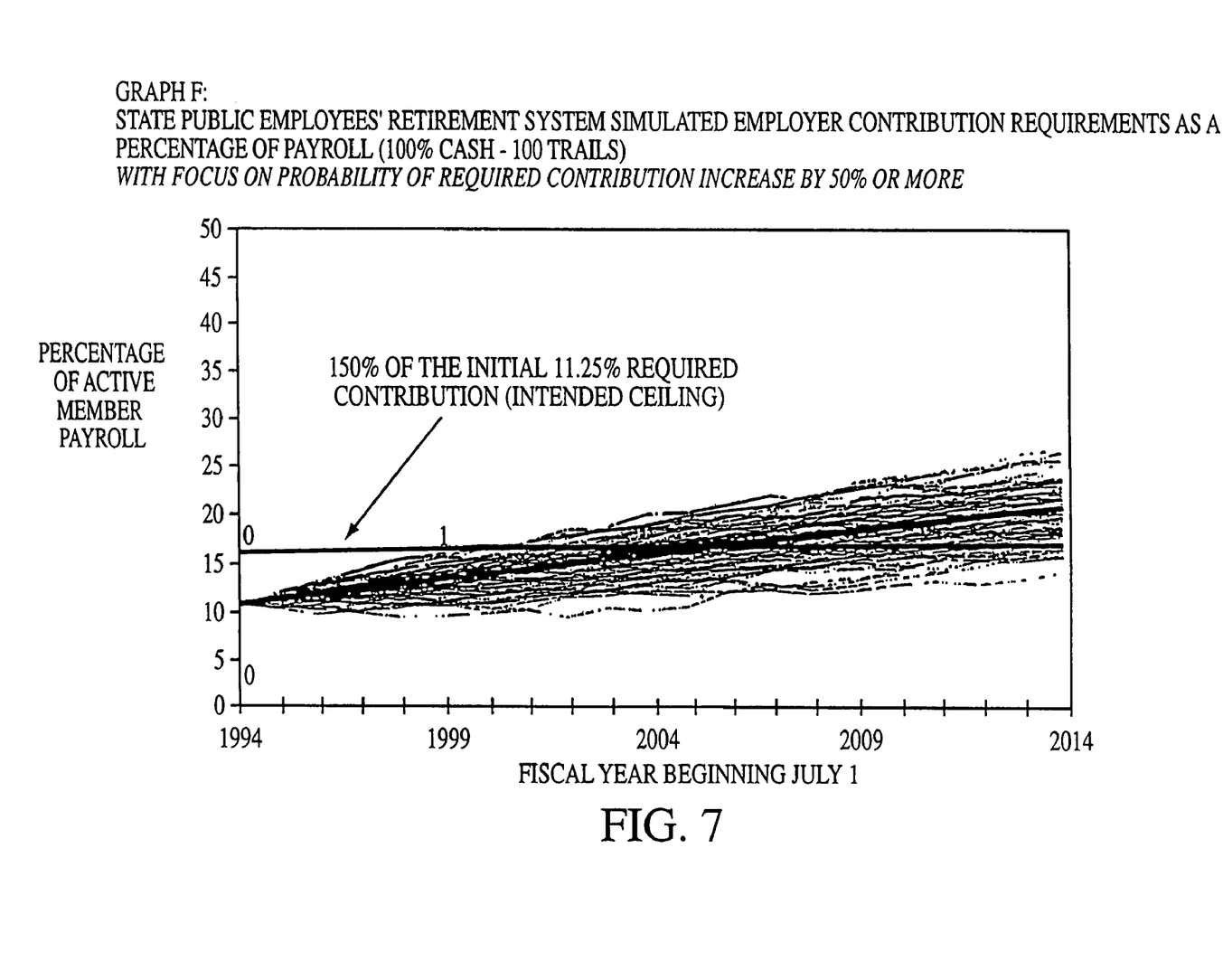
FIG. 7 is a graph of 100-trial simulations of contribution requirements of a pension trust fund as a percentage of payroll with a focus on the probability of a required contribution increase of 50% or more.
Figure 8:
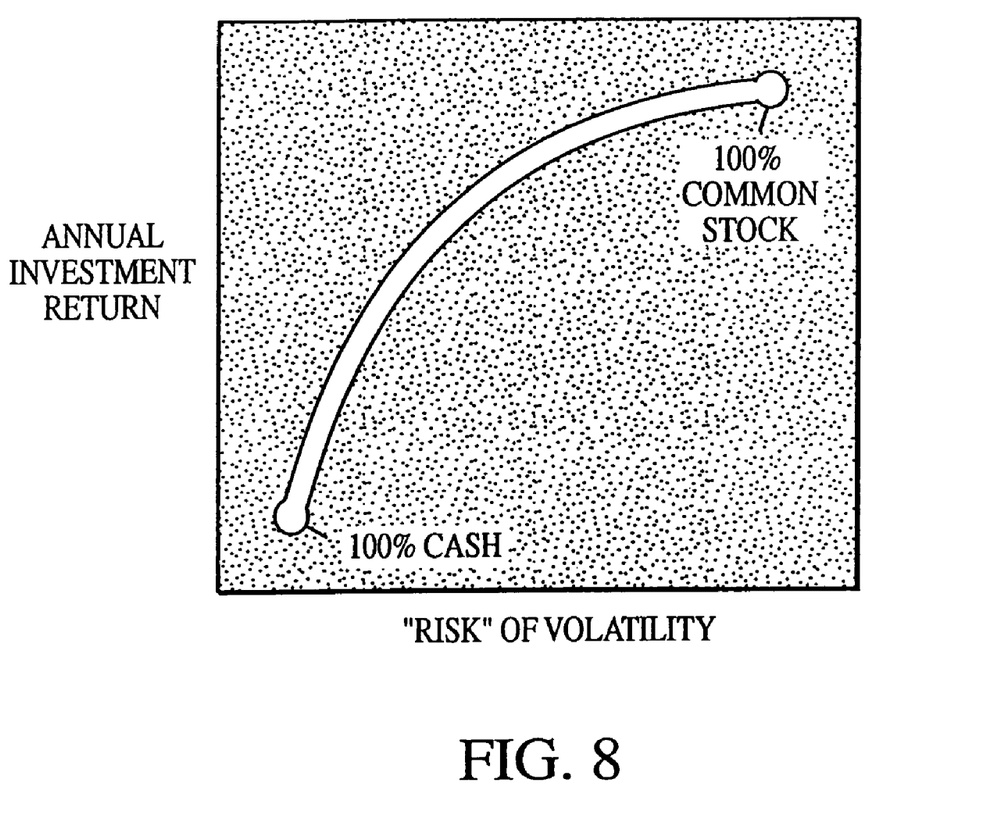
FIG. 8 is a graph relating annual investment return to risk of volatility.
Figure 9A:
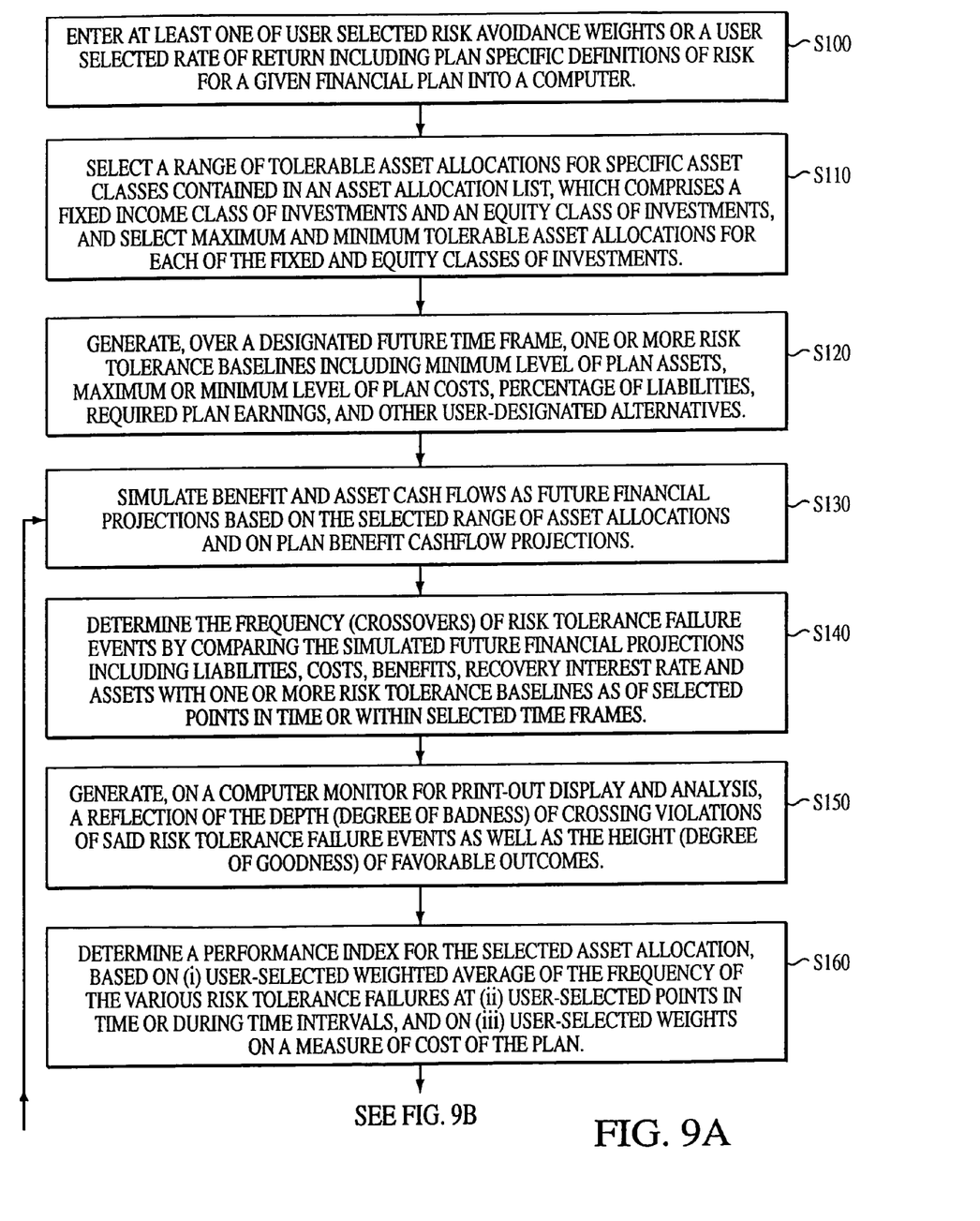
FIGS. 9A and 9B are a flow chart of an embodiment of the instant invention.
Figure 9B:
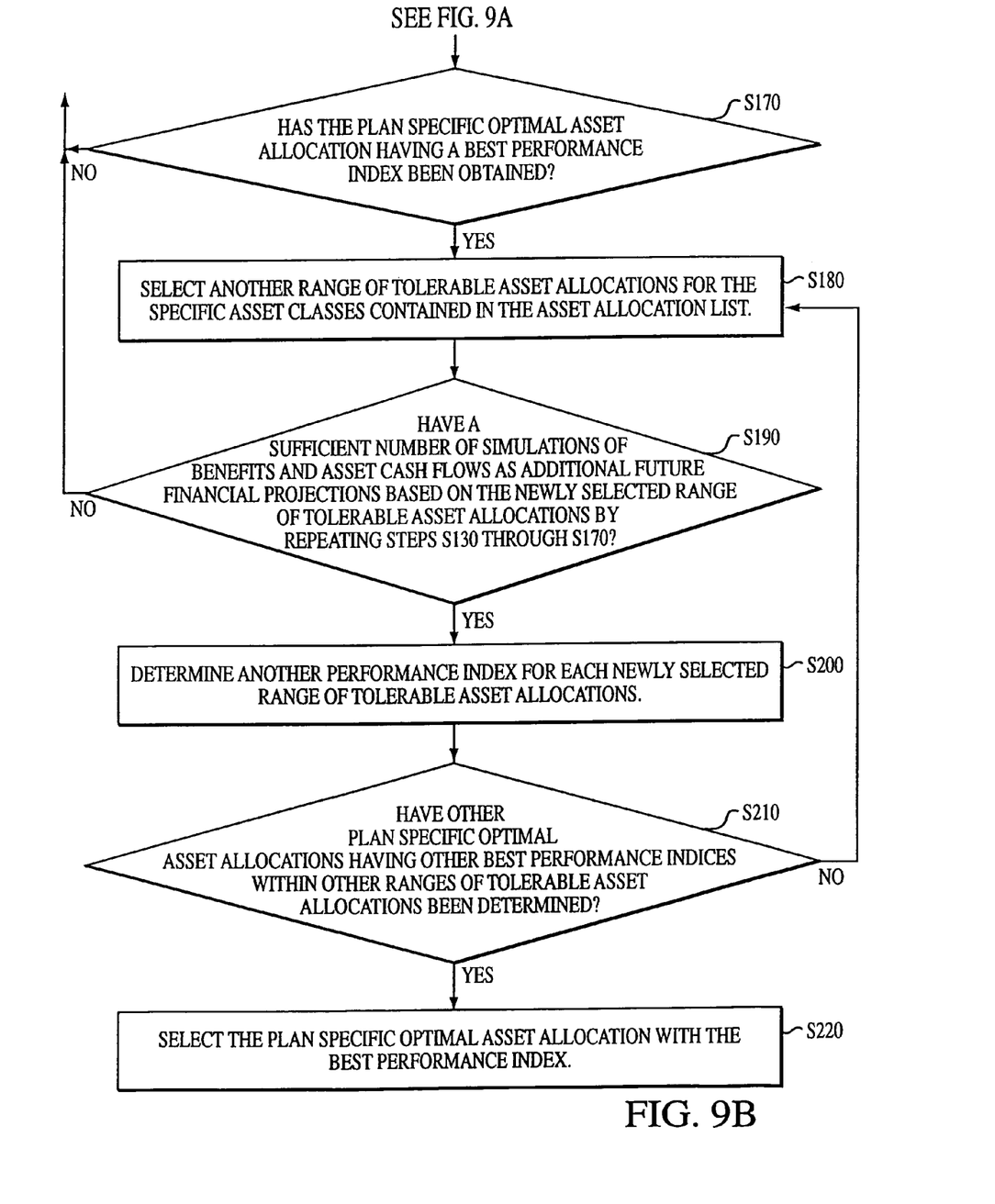

By way of illustration, FIGS. 9A and B show an embodiment of the instant invention.

In Step S100, the user enters user selected risk avoidance weights and/or a rate of return including plan specific definitions of risk for a given for a given financial plan into a computer. In Step S110, the computer and/or the user selects a range of tolerable asset allocations for specific asset classes contained in an asset allocation list, which comprises a fixed income class of investments and an equity class of investments, and select maximum and minimum tolerable asset allocations for each of the fixed and equity classes of investments.

In Step S120, the computer according to the instant invention generates, over a designated future time frame, one or more risk tolerance baselines including minimum level of plan assets, maximum or minimum level of plan costs, percentage of liabilities, required plan earnings, and other user-designated alternatives. In Step S130, the computer in accordance with the instant invention simulates benefit and asset cash flows as future financial projections based on the selected range of asset allocations and on plan benefit cashflow projections. In Step S140, the computer determines the frequency (crossovers) of risk tolerance failure events by comparing the simulated future financial projections including liabilities, costs, benefits, recovery interest rate and assets with one or more risk tolerance baselines as of selected points in time or within selected time frames.

In Step S150, the computer according to the instant invention generates, on a computer monitor for print-out display and analysis, a reflection of the depth (degree of badness) of crossing violations of said risk tolerance failure events as well as the height (degree of goodness) of favorable outcomes. In Step S160, the computer determines a performance index for the selected asset allocation, based on (i) user-selected weighted average of the frequency of the various risk tolerance failures at (ii) user-selected points in time or during time intervals, and on (iii) user-selected weights on a measure of cost of the plan.

In Step S170, the computer in accordance with the instant invention determines whether the plan specific optimal asset allocation having a best performance index has been obtained. If not, Steps S130 through S170 are repeated.

In Step S180, the computer and/or the user selects another range of tolerable asset allocations for the specific asset classes contained in the asset allocation list. In Step S190, the computer determines whether a sufficient number of simulations of benefits and asset cash flows as additional future financial projections based on the newly selected range of tolerable asset allocations by repeating steps S130 through S170.

In Step S200, the computer determines another performance index for each newly selected range of tolerable asset allocations. In Step S210, the computer determines whether other plan specific optimal asset allocations having other best performance indices within other ranges of tolerable asset allocations have been determined. In Step S220, the computer according to the instant invention selects the plan specific optimal asset allocation with the best performance index.

The many features and advantages of the invention are apparent from the detailed specification, and thus, it is intended by the appendix claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer program product storing computer instructions therein for instructing a computer to determine a substantially optimal asset allocation utilizing cash flow simulation, the computer program product comprising:
   a recording medium readable by the computer; and,
   computer instructions stored on said recording medium, wherein the computer instructions instruct the computer to:
   (a) permit a user to select at least one of a risk avoidance weight or a rate of return for a given retirement plan;
   (b) facilitate the selection, by at least one of the user and the computer, of a plurality of asset allocations, wherein the plurality of asset allocations includes at least one of a fixed income or an equity asset;
   (c) determine a performance index for each asset allocation in the selected plurality of asset allocations, wherein the performance index determination is made by:
      i) generating one or more risk tolerance baselines based on one or more user defined risk tolerance factors;
      ii) simulating benefit and asset cash flows as future financial projections based on plan benefit cashflows and each asset allocation in the selected plurality of asset allocations;
      iii) determining if at least one risk tolerance failure occurs by comparing the future financial projections with the one or more risk tolerances; and, iv) assigning a performance index to each of the selected plurality of asset allocations based on at least said determining step (iii); and, (d) indicate to the user that the asset allocation with the best performance index from among the plurality of selected asset allocations is the substantially optimal asset allocation.

2. The computer program product according to claim 1 wherein the performance index of each asset allocation is based on a weighted average of the occurrence of the risk tolerance failures and cost of the given retirement plan.

3. The computer program product according to claim 1 wherein step (iv) further comprises the steps of:
generating by at least one of the user and the computer a plurality of criteria for ranking the performance of each asset allocation; and
determining a substantially optimal allocation having a best performance among the plurality of criteria for each asset allocation.

4. The computer program product according to claim 3 wherein one of the plurality of criteria is based on a weighted average of the occurrence of the risk tolerance failure and cost of the given retirement plan.

5. The computer program product according to claim 1, wherein the one or more user defined risk tolerance factors comprises user-defined adverse circumstances.

6. The computer program product according to claim 5, wherein step iii) comprises excluding asset allocations that cause the user-defined adverse circumstances to occur.

7. A computer program product storing computer instructions therein for instructing a computer to determine a substantially optimal asset allocation utilizing cash flow simulation, the computer program product comprising:
a recording medium readable by the computer; and
the computer instructions stored on said recording medium instructing the computer to:
permit a user to select at least one of a risk avoidance weight or a rate of return for a given financial plan;
facilitate the selection, by at least one of a user and the computer, of an asset allocation for specific asset classes;
generate a plurality of asset cash flow projections based on the selected asset allocation;
generate a single baseline, simulation average baseline, or collection of risk tolerances based on (i) a single predefined risk tolerance factor, (ii) an average of the risk tolerance factors evolving from all the asset cash flow projections in each simulation or (iii) a separate risk tolerance factor evolving from each cash flow projection within each simulation trial;
determine if a risk tolerance failure occurs by comparing the asset cash flow projection with the risk tolerances underlying the simulation; and
repeat this process for at least one other asset allocation until that asset allocation generating the lowest rate of risk tolerance failure is found, thereby determining the substantially optimal asset allocation.

8. The computer program product according to claim 7, wherein the risk avoidance weight comprises user-defined adverse circumstances.

9. The computer program product according to claim 8, wherein the occurrence of risk tolerance failures comprises excluding asset allocations that cause the user-defined adverse circumstances to occur.

10. A computer program product storing computer instructions therein for instructing a computer to optimize a defined benefit retirement plan asset allocation, the computer program product comprising:
a recording medium readable by the computer; and
the computer instructions stored on said recording medium instructing the computer to substantially optimize the defined benefit retirement plan asset allocation as a mix of assets which may be expected to reduce the probability of the defined benefit retirement plan experiencing a user defined adverse circumstance as of a selected future date or within a specified period,
wherein the defined benefit retirement plan is a specific year-by-year projected benefit outflow from a specific level of underlying assets, a specific employee contribution stream from an open group of current and future employees and a specific percentage of open group payroll employer contribution stream.

11. The computer program product according to claim 10 wherein the defined benefit retirement plan is subject to anticipated asset class gains and losses that my be above or below expected levels.

12. The computer program product according to claim 10 wherein the user defined adverse circumstance includes at least one of user selected risk avoidance weights or a user selected rate of return including a weighted average of one or more of the following: (i) assets falling below a specific multiple of benefits, (ii) employer contributions required to maintain a level percentage of payroll cost for plan financial soundness rising or falling below a first certain percentage of initial level, (iii) assets falling below a second certain percentage of liabilities or (iv) assets falling below a point from which a return to the initial level of expected investment return has a lower than acceptable probability.

13. The computer program product according to claim 10 wherein the mix of assets in the defined benefit retirement plan is constrained by a user defined asset class portion limit.

14. The computer program product according to claim 10, wherein the optimization comprises excluding mixes of assets that cause the user defined adverse circumstances to occur.

15. A computer program product storing computer instructions therein for instructing a computer to determine a substantially optimal asset allocation utilizing cash flow simulation, the computer program product comprising:
a recording medium readable by the computer; and
the computer instructions stored on said recording medium instructing the computer to:
(a) receive criteria from a user, wherein the criteria includes at least one of a user selected risk avoidance weight, a user selected rate of return, or user selected plan profile information, asset information, and economic assumptions;
(b) select, by at least one of a user and the computer, at least one asset allocation, wherein the at least one selected asset allocation includes specific asset classes;
(c) generate, for each of the at least one selected asset allocation, multiple cash flow forecasts of (i) plan assets and (ii) one or more user-selected risk tolerances;
(d) determine a weighted average measure of risk tolerance failure by examining the number of violations of the one or more user-selected risk tolerances and generate a number of favorable and unfavorable outcomes; and
(e) report to the user the asset allocation having substantially optimal performance.

16. A computer program product according to claim 15, wherein said step (c) further comprises the step of including, in a determination of a best performance, risk tolerance failures at or within different intervals.

17. A computer program product according to claim 15, wherein said step (c) further comprises the step of including, in a determination of a best performance, a weighted measure of a cost associated with the defined benefit plan.

18. The computer program product according to claim 15 wherein the asset information comprises current market value and current asset allocation by class.

19. The computer program product according to claim 18 wherein the asset class comprises a fixed income class of investments and an equity class of investments.

20. The computer program product according to claim 15 wherein the economic assumptions comprise an assumed rate of return on plan assets, employee contribution requirements, third-party financing input, and employer funding method in place.

21. The computer program product according to claim 15 wherein step (b) further comprises the step of selecting a maximum and minimum asset allocation for each of a fixed class of investments and an equity class of investments.

22. The computer program product according to claim 15 wherein the multiple cash flow forecasts are generated stochastically.

23. The computer program product according to claim 15 wherein the at least one asset allocation is projected into the future by starting with plan assets, subtracting projected benefit disbursements, adding projected employee and third-party contributions, introducing projected investment returns and a projected percentage of payroll employer contributions as are necessary to maintain financial soundness of the at least one asset allocation.

24. The computer program product according to claim 23 wherein the projected percentage of payroll employer contributions are dependent on an overplay of computer-developed amortization over a user-selected amortization period of investment return gains and losses relative to an underlying user-selected baseline rate of return.

25. The computer program product according to claim 15 wherein the one or more user-selected risk tolerances include:
   a user-selected multiple of benefits;
   a projected percentage of payroll employer contribution level;
   a user-designated percentage of user-defined liabilities; and
   that a diminished level of assets from which return to an initially assumed rate of investment return within a user-selected number of years has a lower user-designated probability of occurrence than acceptable to a user.

26. The computer program product according to claim 15 wherein projected investment returns of individual asset classes are either an interaction of projected inflation deflators and real (net of inflation) asset class returns generated independently of each other or in tandem, with projections historically (or modified historically) or parametrically developed or, projected nominal rates of return of individual asset classes are extracted from history by stringing together consecutive periods of user-selected length.

27. The computer program product according to claim 15 wherein best performance is defined by the lowest weighted average measure or risk tolerance failure.

28. The computer program product according to claim 15, wherein the user selected risk avoidance weight comprises at least one user-defined adverse circumstance.

29. The computer program product according to claim 28, wherein the unfavorable outcomes comprise asset allocations that cause the at least one user-defined adverse circumstance to occur.

30. A computer program product storing computer instructions therein for instructing a computer to determine a substantially optimal asset allocation utilizing cash flow simulation, the computer program product comprising:
   a recording medium readable by the computer; and
   the computer instructions stored on said recording medium instructing the computer to:
   (a) receive from a user at least one of risk avoidance weights or a rate of return including definitions of risk, for a given financial plan;
   (b) select, by at least one of a the user and the computer, an asset allocation for specific asset classes;
   (c) generate, over a designated future time frame, one or more risk tolerances including a minimum level of plan assets, maximum or minimum level of plan costs, a percentage of liabilities, and required plan earnings;
   (d) simulate benefit and asset cash flows as future financial projections based on the selected asset allocation and on the plan benefit cashflow projections;
   (e) determine by the computer a number of risk tolerance failures by comparing the simulated future financial projections with one or more risk tolerances as of selected points in time or within selected time frames;
   (f) generate a number of favorable and unfavorable outcomes;
   (g) determine a performance of the selected asset allocation;
   (h) select, by at least one of the user and the computer, another asset allocation for the specific asset classes;
   (i) simulate benefits and asset cash flows as additional future financial projections based on the newly selected asset allocation by repeating steps (d) through (g);
   (j) determine another performance for the newly selected asset allocation;
   (k) repetitively perform said steps (h), (i) and (j) until the asset allocation having the best relative performance is determined;
   (l) select as the substantially optimal asset allocation the asset allocation with the best performance; and
   (m) present the substantially optimal asset allocation to the user.

31. The computer program product according to claim 30 wherein the future financial projections comprise liabilities, costs, benefits, a recovery interest rate, and assets.

32. The computer program product according to claim 30 wherein the performance in step (g) is based on a user-selected weighted average of the frequency of the various risk tolerance failures at user-selected points in time or during time intervals, and on user-selected weights on a measure of cost of the given financial plan.

33. The computer program product according to claim 30 wherein the best relative performance in step (k) is based on a user-selected weighted average of the frequency of the various risk tolerance failures at user-selected points in time or during time interview, and on user-selected weights on a measure of cost of the given financial plan.

34. The computer program product according to claim 30 wherein the asset classes comprises a fixed income class of investments and an equity class of investments.

35. The computer program product according to claim 30 wherein step (b) further comprises selecting maximum and minimum tolerable asset allocations for each of a fixed class of investments and an equity class of investments.

36. The computer program product according to claim 30, wherein the at least one risk avoidance weights comprises at least one user-defined adverse circumstance.

37. The computer program product according to claim 36, wherein the risk tolerance failures comprise asset allocations that cause the user-defined adverse circumstances to occur.

38. A computer program product storing computer instructions therein for instructing a computer to determine a substantially optimal asset allocation utilizing cash flow simulation responsive to asset allocations and one or more risk tolerances based on one or more user defined risk tolerance factors, the computer program product comprising:
 a recording medium readable by the computer; and
 the computer instructions stored on said recording medium instructing the computer to:
 (a) determine when a risk tolerance failure occurs by comparing a user defined future financial projection responsive to an asset allocation selected by at least one of a user and the computer with the one or more risk tolerances;
 (b) determine a performance for the selected asset allocation responsive to at least the occurrence of the risk tolerance failure;
 (c) repeat steps (a) and (b) for at least one other selected asset allocation, thereby generating another performance of each respective asset allocation, and determine the substantially optimal asset allocation having a best performance from among the asset allocations; and
 (d) present the substantially optimal asset allocation to the user.

39. The computer program product according to claim 38, wherein the user defined risk tolerance factors comprise user selected risk avoidance weights which are applied to at least one of predefined risk failure weights and average return for each asset allocation.

40. The computer program product according to claim 38, wherein the user defined risk tolerance factors establish a threshold multiple of a risk factor as of at least one of a given time and within a given time frame.

41. The computer program product according to claim 38, wherein the user defined future financial projection comprises at least one of user selected risk avoidance weights or a user selected rate of return including definitions of risk.

42. The computer program product according to claim 38, wherein step (b) generates the relative performance for the selected asset allocation based on a weighted average of the occurrence of the risk tolerance failures and a cost of a plan.

43. The computer program product according to claim 38, wherein the one or more risk tolerances comprises at least one user-defined adverse circumstance.

44. The computer program product according to claim 43, wherein step (b) comprises excluding asset allocations that cause the at least one user-defined adverse circumstance to occur.

45. A computer program product storing computer instructions therein for instructing a computer to determine a substantially optimal asset allocation utilizing cash flow simulation responsive to plan information, a range of tolerable asset allocations and one or more risk tolerances based on one or more user defined risk tolerance factors, the computer program product comprising:
 a recording medium readable by the computer; and
 the computer instructions stored on said recording medium instructing the computer to:
 (a) determine the frequency of risk tolerance failures within any selected future time interval by counting the number of crossings of (i) a specified number of simulations of user defined projected assets, user defined projected costs or a user defined projection of any other evolving financial characteristics over (ii) one or more risk tolerances, where plan assets are allocated to any one of a number of asset class configurations;
 (b) generate for each asset allocation a weighted average failure rate frequency, wherein the frequency of failure to avoid each user selected risk tolerance factor at each user specified interval is given a user assigned weight;
 (c) repeat steps (a) and (b) for a sufficient number of asset allocations; and
 (d) presenting at least a substantially optimal asset allocation to the user.

46. The computer program product according to claim 45, wherein step (b) comprises the step of generating a measure of the cost of the plan to be included, with its user selected weight, as a component of the performance of a particular asset allocation.

47. The computer program product according to claim 45, wherein step (a) further comprises a display of the depth of crossing violations of said risk tolerance failures as well as the height of favorable outcome.

48. The computer program product according to claim 45, wherein the one or more risk tolerances comprise user-defined adverse circumstances.

49. The computer program product according to claim 48, wherein the failure rate compnses asset allocations that cause the user-defined adverse circumstances to occur.

50. A computer program product storing computer instructions therein for instructing a computer to perform a process for determining a substantially optimal asset allocation utilizing cash flow simulation responsive to tolerances based on one or more user defined risk tolerance factors, the program product comprising:
 a recording medium readable by the computer; and
 the computer instructions stored on said recording medium instructing the computer to:
 (a) determine when a risk tolerance failure occurs by comparing a user defined future financial projections responsive to an asset allocation with the one or more user defined risk tolerance factors;
 (b) determine a performance for the selected asset allocation responsive to at least the occurrence of the risk tolerance failure;
 (c) repeat steps (a) and (b) for at least one other selected asset allocation, thereby generating another performance of each respective asset allocation, and determining the substantially optimal asset allocation having a best performance from among the different asset allocations; and
 (d) displaying to the user at least the asset allocation having the best performance.

51. The computer program product according to claim 50, wherein the one or more user defined risk tolerance factors comprise user selected risk avoidance weights which are applied to at least one of predefined risk failure weights and average return for each asset allocation.

52. The computer program product according to claim 50, wherein the user defined risk tolerance factors establish a threshold multiple of a risk factor a of at least one of a given time and within a given time frame.

53. The computer program product according to claim 50, wherein the user defined future financial projection comprises at least one of user selected risk avoidance weights or a user selected rate of return including definition of risk.

54. The computer program product according to claim 50, wherein performance of the selected asset allocation is based on a weighted average of the occurrence of the risk tolerance failure and a cost of a plan.

55. The computer program product according to claim 50, wherein the one or more risk tolerances comprises user-defined adverse circumstances.

56. The computer program product according to claim 55, wherein the risk tolerance failures comprise portfolios that cause the user-defined adverse circumstances to occur.

57. A method of simulating future cash flow for a given asset allocation, comprising:
- using user-selected levels for risks;
- measuring the frequency of failure to avoid risks;
- using the method to obtain the optimum performance asset allocation; and
- reporting the optimum performance asset allocation.

58. The method of claim 57, wherein the user-selected levels for risks include risk tolerance failures at or within different intervals.

59. The method according to claim 57, wherein the user-selected levels for risks includes a weighted measure of a plan.

60. The method of claim 57, wherein the risks comprise user-defined adverse circumstances.

61. The method of claim 60, wherein the failure to avoid risks comprises excluding portfolios that cause the user-defined adverse circumstances to occur.

62. A computer program product storing computer instructions therein for instructing a computer to perform a computer-implemented and user assisted process for optimizing a defined benefit retirement plan asset allocation, the program product comprising:
- recording medium readable by the computer; and
- the computer instructions stored on said recording medium instructing the computer to perform the computer-implemented and user assisted process, the instructions including the steps of:
  - excluding at least one mix of assets which may be expected to deliver a high probability of the plan experiencing a user defined adverse circumstance as of a selected future date or within a specified period; and
  - allocating assets by at least one of a user and the computer, responsive to said exclusion of at least one mix of assets;
- wherein the defined benefit retirement plan is a specific year-by-year projected benefit outflow from a specific level of underlying assets, a specific employee contribution stream from an open group of current and future employees and a specific percentage of open group payroll employer contribution stream.

\* \* \* \* \*